United States Patent [19]

Bloch

[11] Patent Number: 4,743,079
[45] Date of Patent: May 10, 1988

[54] CLAMPING DEVICE UTILIZING A SHAPE MEMORY ALLOY

[75] Inventor: Joseph T. Bloch, Seattle, Wash.

[73] Assignee: The Boeing Company, Seattle, Wash.

[21] Appl. No.: 913,162

[22] Filed: Sep. 29, 1986

[51] Int. Cl.$^4$ ............................................. H01R 13/20
[52] U.S. Cl. .................... 439/161; 285/404; 285/381; 403/404; 403/328; 439/932
[58] Field of Search .................. 339/DIG. 1, 30, 255; 285/404, 381; 403/328, 404

[56] References Cited

U.S. PATENT DOCUMENTS

| | | | |
|---|---|---|---|
| 3,379,218 | 4/1968 | Conde | 285/381 |
| 3,405,958 | 10/1968 | Holdren | 285/404 |
| 3,913,444 | 10/1975 | Otte | 339/30 |

FOREIGN PATENT DOCUMENTS

| | | | |
|---|---|---|---|
| 81612 | 10/1956 | Denmark | 339/30 |
| 3433757 | 3/1986 | Fed. Rep. of Germany | 285/381 |
| 858258 | 1/1961 | United Kingdom | 339/30 |

Primary Examiner—Gil Weidenfeld
Assistant Examiner—Paula A. Austin
Attorney, Agent, or Firm—Foley & Lardner

[57] ABSTRACT

A clamping device for securing an object within an aperture of a ring member utilizing a shape memory alloy material. The shape memory alloy material contracts when heated and operates to bias pin members inwardly within a central opening of the ring to thereby secure an object such as a canister placed therein. The shape memory alloy material may be in the form of a strap or wire which is easily heated and provides for a fast clamping and release action of the clamping device.

15 Claims, 3 Drawing Sheets

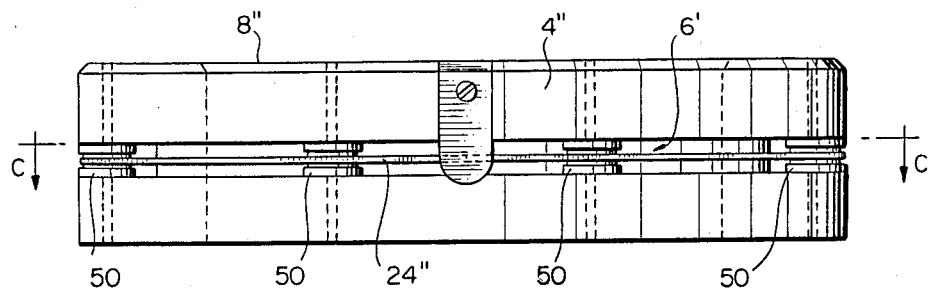
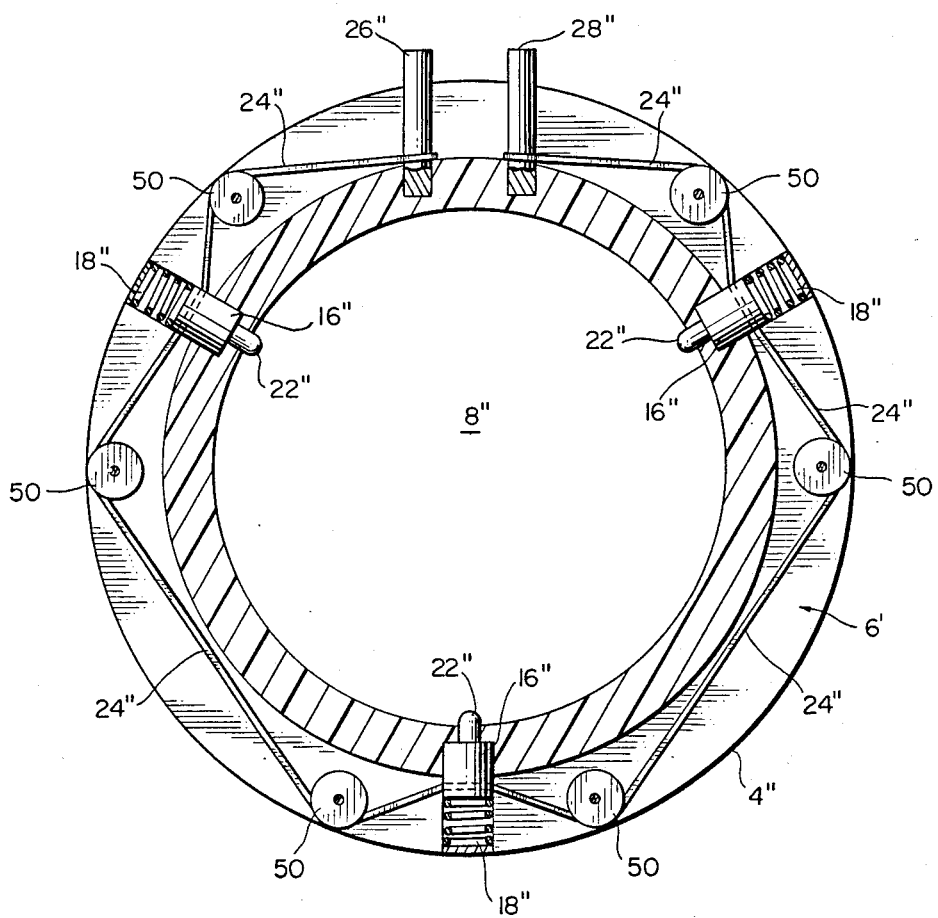

CLAMPING DEVICE UTILIZING A SHAPE MEMORY ALLOY

BACKGROUND OF THE INVENTION

The invention is directed toward a clamping device which utilizes a shape memory alloy as an operative component thereof.

Various types of connectors have been utilized which employ a heat recoverable metallic band made, for example, of Nitinol. Nitinol is an electrically conductive alloy containing large proportions of nickel and titanium. A Nitinol wire, for example, may be stretched up to about 10% of its length and will remain in the stretched state even when the tensile stress used to stretch the wire is removed. If the temperature of the wire is then elevated above its martensitic critical temperature, the wire will return to its original unstretched state as if it had a "memory" of its unstretched length. When the wire contracts to its original length it exerts a contracting force which has been used in various applications. U.S. Pat. No. 4,002,954 discloses the utilization of a Nitinol wire for activating a photographic shutter and sets forth a particular electronic circuit arrangement to provide a current pulse sufficient to heat the Nitinol wire to its critical temperature. U.S. Pat. Nos. 3,740,839 and 4,497,527 disclose connecting devices utilizing a socket member with several tines and a band positioned over the tines for biasing them toward their center in a contracted state of the band. The band is made of a heat recoverable metallic material. Additional teachings of heat shrinkable and heat recoverable material may be found in U.S. Pat. Nos. 3,445,898, 3,622,941 and 4,556,050. The above enumerated patents are hereby incorporated by reference.

SUMMARY OF THE INVENTION

It is an object of the invention to provide a light weight and easily fabricated clamping device which utilizes a shape memory alloy as an operative part thereof.

It is a further object of the invention to provide a clamping device utilizing a shape memory alloy in which an electrical current may be passed through the shape memory alloy to thereby heat same and cause the alloy to contract thereby actuating the clamping mechanism.

Yet another object of the invention is to provide a relatively large clamping device for securing objects having diameters of three inches and above which may be clamped utilizing a thin wire or band of a shape memory alloy having an electric current passing therethrough.

The invention is direction to a clamping device which comprises a ring member, a plurality of apertures extending radially through the ring member, a plurality of pins, a shape memory alloy (SMA) material, means for heating the SMA material and means for securing the SMA material member to the ring member. The ring member has a central opening symmetrically positioned about an axis thereof. The plurality of pins correspond in number to the number of apertures, and each pin is positioned at least partially within the corresponding aperture. A spring biases each pin for movement in one of a first direction radially outwardly away from the ring member axis and a second direction radially inwardly, toward the ring member axis. The SMA material member has a characteristic of contracting when heated. The SMA member is provided to extend substantially along an outer circumference of the ring member. Further, each pin has a first portion extendable within the central opening of the ring member. The SMA material member contracts when heated to move each of the pins in a direction opposite to the spring bias direction to thereby move a portion of each pin in a position either extending within the central opening of the ring member or not extending within the central opening of the ring member. Thus, an object which is placed within the central opening of the ring member may be releasably clamped therein by means of the pins and by means of action of the SMA material member.

BRIEF DESCRIPTION OF THE DRAWINGS

Other objects and advantages of the invention will become apparent in view of the detailed description set forth below taken in conjunction with the drawings wherein:

FIG. 5 is a bottom view of a third embodiment of the invention; and

FIG. 6 is a side view of the invention shown partially sectioned.

DETAILED DESCRIPTION OF THE PREFERRED EMBODIMENTS

Figure 1:
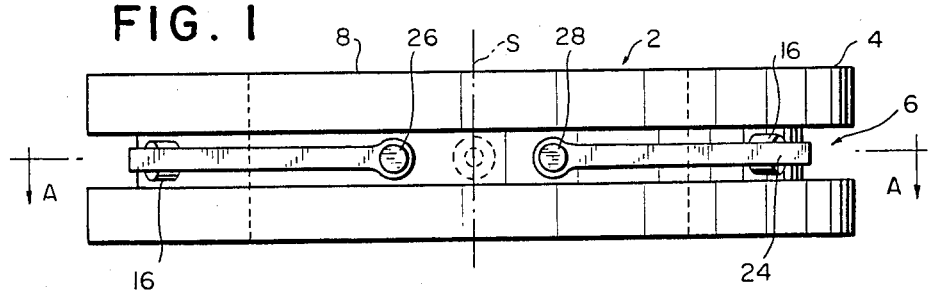
FIG. 1 is a top view of the clamping device in accordance with the invention.
Figure 2:
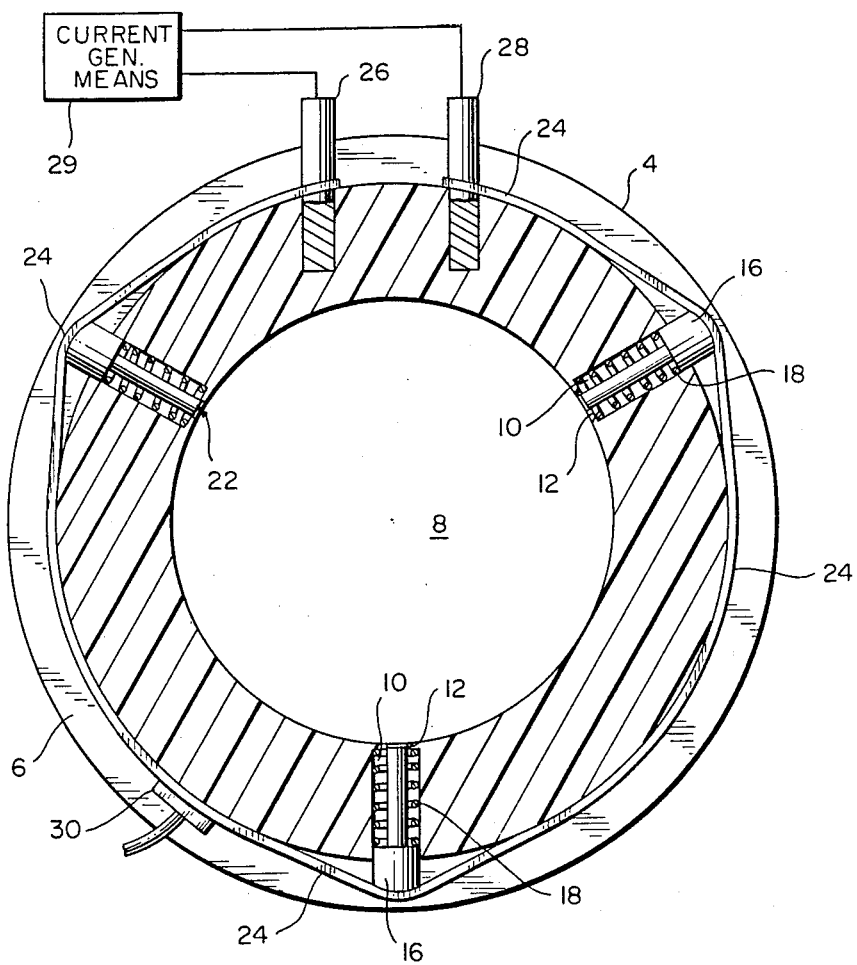
FIG. 2 is a cross-sectional view of the clamping device taken along line A—A of FIG. 1.

A first embodiment of the invention is illustrated in FIGS. 1 and 2. As may be seen therein, a clamping device 2 comprises a ring member 4 having a groove 6 along an outer circumferential portion thereof. The ring member 4 has a central opening 8 which is symmetrically positioned about a central, symmetry axis of the ring member labelled S in FIG. 1. The ring member 4 further has a plurality of apertures 10 which are circumferentially and symmetrically disposed about the circumference of the ring member and extend therethrough in a radial direction. Each aperture 10 has a smaller diameter portion near the interior of the ring member which defines a shoulder 12. Each aperture 10 is provided with a pin 16 and a spring 18 in the form of a coil. Each spring 18 has one end thereof resting upon the corresponding shoulder 12 and biases the pin 16 radially outwardly. For this purpose, the pin 16 may have an enlarged head portion at the end thereof most remote from the central opening of the ring member and upon which the other end of the spring rests. A portion 22 of each pin 16 is extensible within the central opening of the ring member when the pin 16 is depressed inwardly toward the central axis. This portion 22 of the pin member 14 makes contact with an object placed within the central opening and desired to be secured by the clamping device. Typically, the object placed within the clamping device will be cylindrical in shape (such as a canister) and have an outer diameter slightly smaller than the inner diameter of the ring member 4. Thus, the portion 22 of each of the pins 16 makes contact with the object and thereby clamps the object to the ring member when sufficient inward force is applied to the pin 16 of each pin member 14 to move same inwardly against the biasing force of the spring 18. Other shapes for the secured object are, of course, also possible. The cross-sectional shape may, for example, be rectangular, octagonal, etc. The number and circumferential position of the pins 16 are selected to optimize contact with the object to be secured.

The requisite force for moving each pin 16 inwardly is supplied by means of contraction of a shape memory alloy (SMA) material, hereinafter SMA material member 24. SMA material member 24 is shown in the form of a thin strap or band of Nitinol but may also be fabricated in the shape of a wire. SMA material member 24 is secured within the groove 6 of the ring member 4 and attached at ends thereof to electrically conductive binding posts 26 and 28. Binding posts 26 and 28 serve the purpose of both securing the ends of the SMA material member 24 and likewise providing electrical contact terminals so that a current pulse may be fed through the SMA material member 24 to heat same. The current may be provided by an electric current generating means 29 which may comprise a battery and appropriate voltage divider. A pulse generating circuit as shown in U.S. Pat. No. 4,002,954 may also be utilized.

In operation, the pin members 14 may initially be in the position as shown in FIGS. 1 and 2. In this state, current is not passing through the SMA material member 24 and the springs 18 are effective to bias the pins 16 outwardly so that the portion 22 of each pin member 14 does not extend within the central opening 8 of the ring member 4. As such, an object to be secured such as a canister or the like can be placed within the central opening 8. Subsequently, a voltage is applied between the binding posts 26 and 28 so that a current may pass through the SMA material member 24 thereby heating same. The SMA material member 24 will thereby contract or shrink to its previously "memorized" dimension which will cause a radially and inwardly directed force to be exerted on each of the pins 16 thereby forcing the portion 22 of each pin 16 within the central opening 8. Each portion 22 will subsequently make contact with the object enclosed within the central opening 8 thereby securing the object to the ring member 4.

Removing of the voltage from the binding posts 26 and 28 will permit the SMA material member 24 to cool thereby allowing it to expand when acted upon by the biasing forces of the spring 18 of each pin 16. Upon expansion, the spring 18 of each pin member 14 biases the corresponding pin 16 radially outwardly so that the portion 22 of each pin 16 no longer extends within the central opening 8. Thus, the object or canister which had been secured is now free to be removed.

Also illustrated in FIG. 2 is a strain gauge 30 which may be positioned on the SMA material member 24 in order to measure the stress of the SMA material. The strain gauge measurement may thus be utilized as an indication of whether the pin portions 22 are within the central opening or withdrawn therefrom. Thus, the strain gauge 30 permits a positive indication of the operative state of the clamping device.

Figure 3:
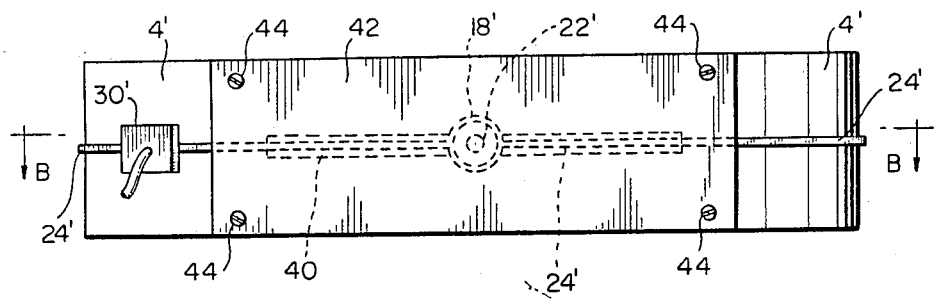
FIG. 3 is a bottom view of a second embodiment of the invention.
Figure 4:
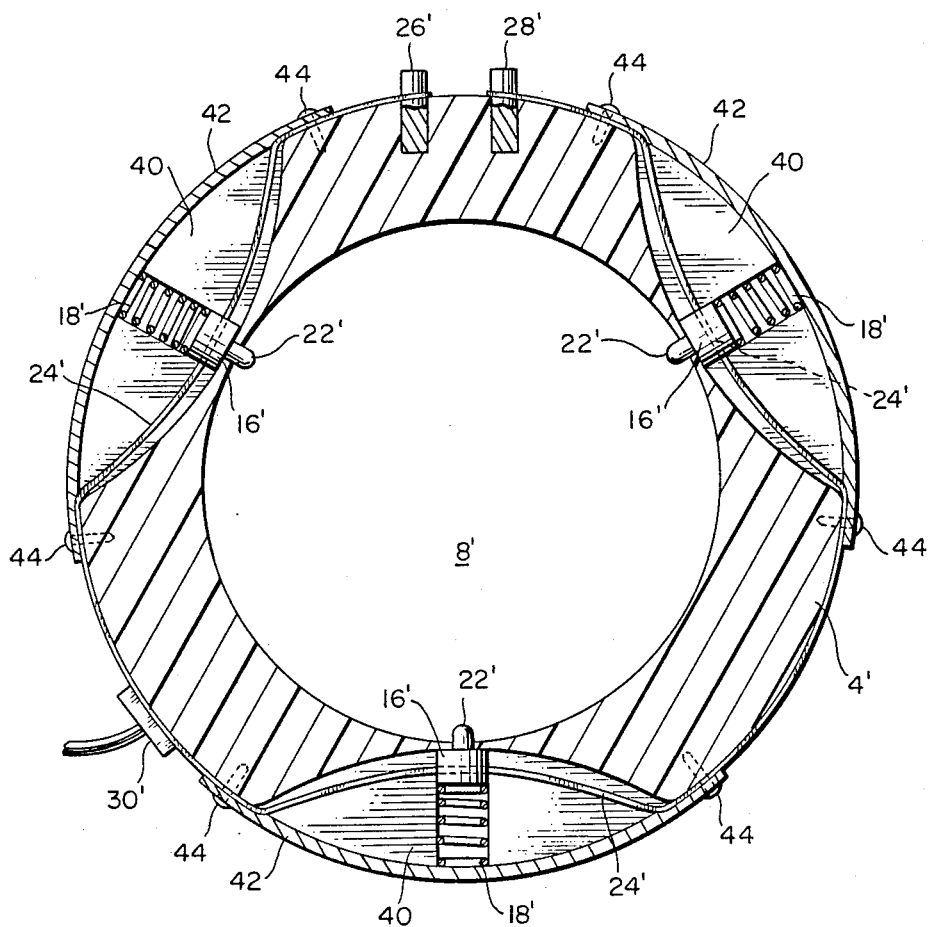
FIG. 4 is a cross-sectional view of FIG. 3 taken along line B—B thereof.

An alternate embodiment of the invention is illustrated in FIGS. 3 and 4. This embodiment is similar to the first embodiment wherein similar elements are labeled with corresponding primed numbers. In this embodiment, the springs now normally bias the pins radially inwardly and the SMA material member 24' is utilized to withdraw the pin members from the central opening. Thus, as illustrated in FIG. 4, spring 18' of pin member 14' biases a portion 22' of a pin 16' radially inwardly and within central opening 8' of ring member 4'. SMA material member 24' in the form of a wire extends around the circumference of the ring member 4' and passes through an aperture within pin 16'. The spring 18' is positioned within a cutout section 40 of the ring member 4' and is retained therein by means of retainer plate 42. Retainer plate 42 is itself secured to ring member 4' by screws 44. When an electrical voltage is applied between the binding post 26' and 28', an electrical current passes through the SMA material member 24' thereby heating same and causing it to contract. Now, however, contraction of the SMA material member 24' exerts a force against the spring 18' to withdraw the portion 22' of the pin 16' away from and out of the central opening 8' of the ring member 4'. As such, voltage applied to the binding post 26' and 28' may be utilized to release the clamping device thus permitting removal of the object, such as a canister, within the central opening of the ring member. Removing of the voltage between the binding post 26' and 28' permits the SMA material member 24' to cool down, and the spring 18' stresses the SMA material member 24' to its elongated state. Spring 18' further biases the portion 22' of the pin 16' inwardly and within the central opening 8' of the ring member 4'. Thus, each spring 18' serves to secure the object or canister within the central opening 8'.

As in the first embodiment, a strain gauge 30' may be utilized to provide a positive indication of the operative clamping state of the device.

A third embodiment of the invention is illustrated in FIGS. 5 and 6. In this embodiment similar elements as appearing in FIGS. 3 and 4 are labeled with double primed numbers. SMA material 24" biases portions 22" of pins 16" radially inwardly within central opening 8" of ring member 4". As in FIG. 4, SMA material 24" is in the form of a wire passing through an aperture in each pin 16". Each spring 18" is retained by means of retaining member 48. In contrast to the embodiment of FIGS. 3 and 4, the embodiment of FIGS. 5 and 6 illustrate the use of pulleys 50 fixed for rotation within groove 6" of ring member 4". The pulleys 50 are effective for reducing friction as the wire expands and contracts and further enables a simple fabrication process of the ring member 4" since large cut-outs adjacent each pin 16" need not be provided. Instead, the low friction pulley arrangement permits the pulleys, pins and SMA material member to be contained within the groove 6".

It is evident that the SMA material may be heated by means other than with electric current. For example, simple atmospheric heating or IR radiation may be employed to heat the SMA material thereby causing its contraction.

Although the invention has been described with reference to preferred embodiments thereof, it is evident to those of skill in the art that various modifications and improvements may be made without departing from the spirit and scope of the invention as defined by the appended claims.

What is claimed is:

1. A clamping device comprising:
   (a) a ring member having a central opening symmetrically positioned about an axis of the ring member;
   (b) a plurality of apertures extending radially through said ring member;
   (c) a plurality of pins, one pin corresponding to each of said plurality of apertures, and each pin positioned at least partially within said corresponding aperture; each pin associated with a spring, said spring biasing said associated pin for movement in one of (1) a first direction, radially outwardly and away from said ring member axis and (2) a second direction, radially inwardly and toward said ring member axis;

(d) a shape memory alloy (SMA) material member having a characteristic of contracting when heated, said SMA material member extending substantially along an outer circumference of said ring member and contacting each pin;

(e) means for heating said SMA material member to cause said SMA material member to contract;

(f) means for securing said SMA material member to said ring member;

wherein said SMA material member contracts when heated to move each of said pins in a direction opposite to the spring bias direction to extend a portion of each pin within the central opening of said ring member, and wherein an object placed within said central opening of said ring member may be releasably clamped therein by means of said pins.

2. A clamping device as recited in claim 1, wherein said plurality of apertures are symmetrically positioned circumferentially about said ring member.

3. A clamping device as recited in claim 1, wherein said spring biases said pins for movement in said first direction, radially outwardly, and said contracting SMA material member moves said pin to position said portion thereof for extending within said central opening.

4. A clamping device as recited in claim 1, wherein said spring biases said pins for movement in said second direction, radially inwardly, and said contracting SMA material member moves said pin to position said portion thereof for not extending within said central opening.

5. A clamping device as recited in claim 1, wherein said heating means comprises means for generating radiant energy and for exposing said SMA material to said radiant energy.

6. A clamping device as recited in claim 1, wherein each spring is in the form of a coil member.

7. A clamping device as recited in claim 1, wherein a plurality of three pins are provided and wherein each pin is symmetrically positioned circumferentially about said ring member axis.

8. A clamping device as recited in claim 1, wherein said ring member is electrically non-conductive and said heating means includes terminals positioned on said ring member electrically contacting said SMA material, said terminals adapted for connection to a voltage source for generating said SMA material by means of an electric current passing therethrough.

9. A clamping device as recited in claim 1, wherein said ring member has a groove extending along at least a portion of an outer periphery thereof and said SMA material member is positioned within said groove for contact with each pin of said plurality of pin members.

10. A clamping device as recited in claim 9, wherein said groove extends substantially around the entire ring member.

11. A clamping device as recited in claim 1, wherein said SMA material member is electrically conductive and said heating means comprises an electric current generating means electrically connected to said SMA material.

12. A clamping device as recited in claim 11, wherein said ring member is made of an electrically non-conductive material.

13. A clamping device as recited in claim claim 11, wherein each spring is in the form of a coil member.

14. A clamping device as recited in claim 1, further comprising a plurality of pulley members secured to said ring member, said SMA material passing around portions of each pulley member.

15. A clamping device as recited in claim 14, wherein said spring biases said pins for movement in said second direction, radially inwardly, and said contracting SMA material member moves said pin to position said portion thereof for not extending within said central opening.

* * * * *